United States Patent [19]

Sumner et al.

[11] Patent Number: 4,569,711
[45] Date of Patent: Feb. 11, 1986

[54] MANUFACTURE OF ELASTOMERIC MATERIAL COPONENTS

[75] Inventors: Anthony J. M. Sumner, Near Stratford-on-Avon; Anthony G. Goodfellow, Maghull, both of England

[73] Assignee: W&A Bates Ltd., London, England

[21] Appl. No.: 590,462

[22] Filed: Mar. 16, 1984

[30] Foreign Application Priority Data

Mar. 23, 1983 [GB] United Kingdom ............... 8307946

[51] Int. Cl.$^4$ ............................................. B29C 47/34
[52] U.S. Cl. ........................ 156/244.11; 156/244.18; 156/304.1; 156/500; 264/176 R; 425/224; 425/365; 425/436 R; 425/504; 425/516
[58] Field of Search ............. 156/243, 244.11, 244.18, 156/244.21, 304.1, 500, 568; 264/176 R, 210.1, 210.2; 425/224, 328, 363, 365, 436 R, 504, 505, 516

[56] References Cited

U.S. PATENT DOCUMENTS 3,159,521 12/1964 Pechman ....................... 156/568
3,709,647 1/1973 Barnhart ....................... 425/224
3,829,271 8/1974 Taylor .......................... 425/224
3,957,570 5/1976 Helm ............................ 156/568

FOREIGN PATENT DOCUMENTS 446286 5/1936 United Kingdom .
732091 6/1955 United Kingdom .
815914 7/1959 United Kingdom .
897383 5/1962 United Kingdom .
1131765 10/1968 United Kingdom .
1332081 10/1973 United Kingdom .
1561453 2/1980 United Kingdom .
1590231 5/1981 United Kingdom .

Primary Examiner—Caleb Weston
Attorney, Agent, or Firm—Stevens, Davis, Miller & Mosher

[57] ABSTRACT

An apparatus and a method of manufacture for discrete elastomeric material components comprising extending material through a die onto the surface of a component holding member, securing the leading end of the extrudate to said member, effecting relative movement to lay the extrudate on the holding member so that the component is produced on said member. The invention also provides for transfer of the component from the member.

18 Claims, 4 Drawing Figures

MANUFACTURE OF ELASTOMERIC MATERIAL COPONENTS

This invention relates to the manufacture of elastomeric material components which may constitute a finished article or which may be assembled with one or more additional components to form a finished article.

Tires are conventionally manufactured by assembling several uncured or unvulcanized rubber components on a former and subsequently subjecting the tire to a curing or vulcanizing treatment. One or more of the individual components may be formed by the extrusion of elastomeric material in continuous strip form of the required cross-section which is cut to the required component length either before or during fitting of the component to the assembly. As an example the tread component is often formed in this way. As the components are uncured or unvulcanized any handling of a component following extrusion and before assembly and vulcanization of the tire must be carried out with great care to avoid damage to the component.

It is an object of the present invention therefore to provide a method of and apparatus for the manufacture of discrete elastomeric components which reduces handling of the uncured/unvulcanized component to a minimum.

According to one aspect of the present invention a method of manufacturing a discrete elastomeric component comprises extruding elastomeric material through a die orifice onto the surface of a component holding member, securing the extrudate to the component holding member, effecting relative movement between the die orifice and the surface of the component holding member to apply the extrudate to said surface and finishing the extrudate to produce a discrete component of the required length.

Preferably the holding member is movable to advance the surface thereof past the die orifice at a rate equal to the rate of extrusion.

The extrudate may be secured to the surface of the holding member by means of vacuum applied to the interior of the holding member the surface of which is porous at least in the region to which the leading end of the extrudate is applied.

More preferably the extrudate is secured to the surface of the holding member by gripping the leading end of the extrudate between the surface of the holding member and a confronting surface of a retainer positioned adjacent to the holding member, the retainer being movable with the holding member to clamp the leading end of the extrudate. Two retainers may be used with a transfer from one to the other partway through the extrusion process.

Subsequent to finishing the extrudate the holding member with the component thereon may be movable to a manufacturing stage or sub-stage remote from the die orifice, the retainer or retainers being returned to a position adjacent to the die orifice for gripping a subsequent extrudate applied to a further holding member. This return movement of the retainer may be used during and/or after application of the extrudate to consolidate the extrudate onto the surface of the holding member thereby preventing the extrudate shrinking lengthwise and increasing in cross-sectional area.

More preferably the extrudate is removed from the holding member at a position downstream of the die orifice such removal commencing before or after finishing the extrudate and the stripped surface is returned to the die orifice to collect a subsequent extrudate. The extrudate may be removed from the holding member by the retainer which transfers the extrudate to a carrier for transferring the component to an assembly stage or sub-stage remote from the die orifice. Alternatively the first retainer may be removed from the leading end of the extrudate and returned to its position adjacent the die orifice and a second retainer is moved into place to hold the leading end and then to effect removal and transference of the component. Preferably the extrudate is consolidated between confronting surfaces of the first holding member and said first and second retainers and of the first or second retainers and carrier thereby preventing the extrudate from shrinking lengthwise and increasing in cross-sectional area.

The extrudate may be finished by cutting the extrudate when the required length of component has been extruded.

According to another aspect of the present invention apparatus for manufacturing a discrete elastomeric component comprises an extrusion die having a die orifice, a component holding member having a surface positioned to receive an extrudate from the die orifice, retaining means for securing the extrudate to the surface of the holding member, means for effecting relative movement between the die orifice and the surface of the holding member to apply the extrudate to said surface and finishing means to produce a discrete component of the required length.

Preferably the holding member is movable to advance the surface thereof past the die orifice. The holding member may comprise a cylindrical drum rotatable about a central axis of rotation whereby the peripheral surface of the drum may be advanced past the die orifice. The retaining means may comprise an annular roller the peripheral surface of which is positioned adjacent to the drum surface and one or both of the confronting surfaces is/are profiled to correspond to the cross-section of the extrudate, for example the roller surface may be provided with a continuous annular groove complementary to the extrudate, the drum surface being planar.

Preferably the roller is rotatable about a first axis of rotation corresponding to the axis of rotation of the drum whereby the roller may move circumferentially with respect to the drum in either direction and means is provided to lock the roller at any desired circumferential position whereby the roller may move with the drum as the latter rotates. Additionally the roller is rotatable about a second axis of rotation corresponding to the centre of the roller whereby the roller may rotate relative to the drum.

Alternatively to the above described single retaining member two retaining members may be used. The first retaining member holding the leading edge from the die orifice and the second retaining member being positioned and movable to take over the retaining position from the first retainer and to effect component removal from the holding member drum. The second retaining member is then preferably an annular roller as above and the first retaining member may be a clamp member across the leading end.

The circumferential length of the drum may be sufficient to form the entire component thereon, either with free ends or with the ends joined to form a continuous annular component but more preferably the extrudate is removed from the drum at a position angularly spaced from the position at which the extrudate is initially applied and transformed via the roller to a carrier ring for transporting the component to a manufacturing stage or sub-stage remote from the die orifice.

The invention will now be described in more detail, by way of example only, with reference to the accompanying drawings, wherein.

Figure 1:
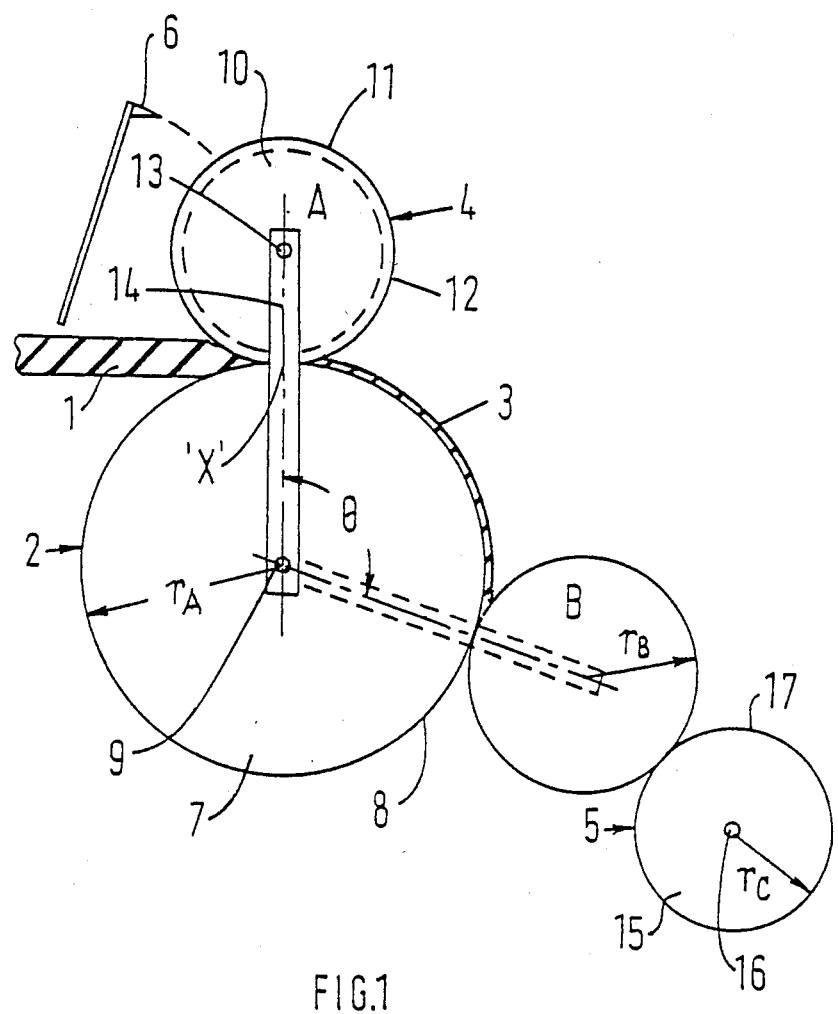
FIG. 1 is a side view of a first embodiment of apparatus according to the present invention.

The apparatus shown in FIG. 1 of the accompanying drawings comprises an extruder 1, a component holding member 2 to which an extrudate 3 is applied, a retainer 4 for clamping the leading end of the extrudate 3 to the member 2 and for subsequently transferring the extrudate 3 to a carrier 5. A pivotally mounted knife blade 6 is provided to cut the extrudate 3 at the die outlet when the required length of extrudate has been formed.

The holding member 2 comprises a cylindrical drum 7 having a planar outer surface 8 which co-operates with the die outlet to form an extrusion orifice having a profile corresponding to that required for the extrudate 3. The drum 7 is rotatable about a central axis 9 and drive means (not shown) is provided to rotate the drum at a rate equal to the extrusion rate.

The retainer 4 comprises a roller 10 positioned with its outer surface 11 abutting the drum surface 8 and having formed therein a continuous annular groove 12 of cross-section corresponding to that of the extrudate 3. The roller 10 is rotatable about a central axis 13 and is mounted for rotation at one end of a support arm 14 the other end of which is mounted for rotation about the drum axis 9. Means (not shown) is provided to lock the arm 14 relative to the drum 7 so that the roller 10 rotates with the drum 7 from position A adjacent to the die outlet to position B shown in phantom lines at which the extrudate 3 is transferred to the carrier 5. Subsequently the locking means may be released to allow arm 14 to rotate relative to the drum 7 to return roller 10 to position A.

The carrier 5 comprises an annular ring 15 rotatable about a central axis 16 and having a planar outer surface 17. The surfaces 8, 11 and 17 are porous in the regions contacted by the extrudate for a purpose described in more detail below.

Operation of the above-described apparatus to provide a discrete elastomeric component e.g. a tyre sidewall, will now be described. Starting with roller 10 in position A and arm 14 locked relative to the drum 7, elastomeric material, e.g. uncured rubber, fed to the extruder 1 is extruded onto surface 8 of the drum and the leading end is received in the groove 12 in the roller surface where it is held between roller 10 and drum 7 thus maintaining its extruded profile. Extrusion is continued while simultaneously rotating drum 7 to apply the extrudate to the drum surface 8 as the latter advances past the die orifice. Arm 14 is locked relative to the drum 7 and rotates therewith bringing roller 10 to position B at which point its outer surface 11 engages the outer surface 17 of carrier ring 15.

At this point ring 15 is rotated causing roller 10 to rotate and the extrudate 3 is stripped from drum 7 and retained in the roller groove 12 by an alternating system of vacuum and pressure applied through slip rings to the porous surfaces of drum 7 and roller 10 until it reaches ring 15 where it is transferred to and held on the ring surface 17 by a similar system. Extrusion is continued until the length of extrudate 3 corresponds to the ring circumference, i.e. $2\pi r_c$ whereupon knife blade 6 is lowered to cut the extrudate at point X and extrusion is stopped. The extrudate 3 is continuously advanced around drum surface 8 and completely transferred to ring surface 17 to form a continuous annular component on the ring 15, the leading and trailing ends of the extrudate being joined and consolidated by passing through the nip defined between roller 10 and ring 15. In addition it will be appreciated that the entire length of the extrudate is maintained in its extruded profile during transfer to the ring 15 by passage through the nip defined between drum 7 and roller 10 followed by the nip between roller 10 and ring 15. Accordingly lengthwise shrinkage and cross-sectional expansion of the component which occur when an uncured rubber extrusion is left free is prevented and the extrusion orifice determines the final cross-section of the component which is therefore accurately controlled.

When transfer of the extrudate is completed arm 14 is released and rotated to return roller 10 to position A where the leading end of the next length of extrudate is received in the groove 12, drum 7 being stationary. Simultaneously ring 15 is removed and replaced by another ring to collect the next length of extrudate. The length of extrudate ($=2\pi r_A \theta/360$) may be varied by altering the angle $\theta$ which the roller 10 subtends between position A and position B so that different sizes of ring 15 may be accommodated. A preferred value for $\theta$ is the range 90° to 270°. Even more accurate control of extrudate length may be obtained by providing the drum 7 with a radially movable blade to trim the leading edge of the extrudate against the surface 8 of the drum 10.

Figure 2:
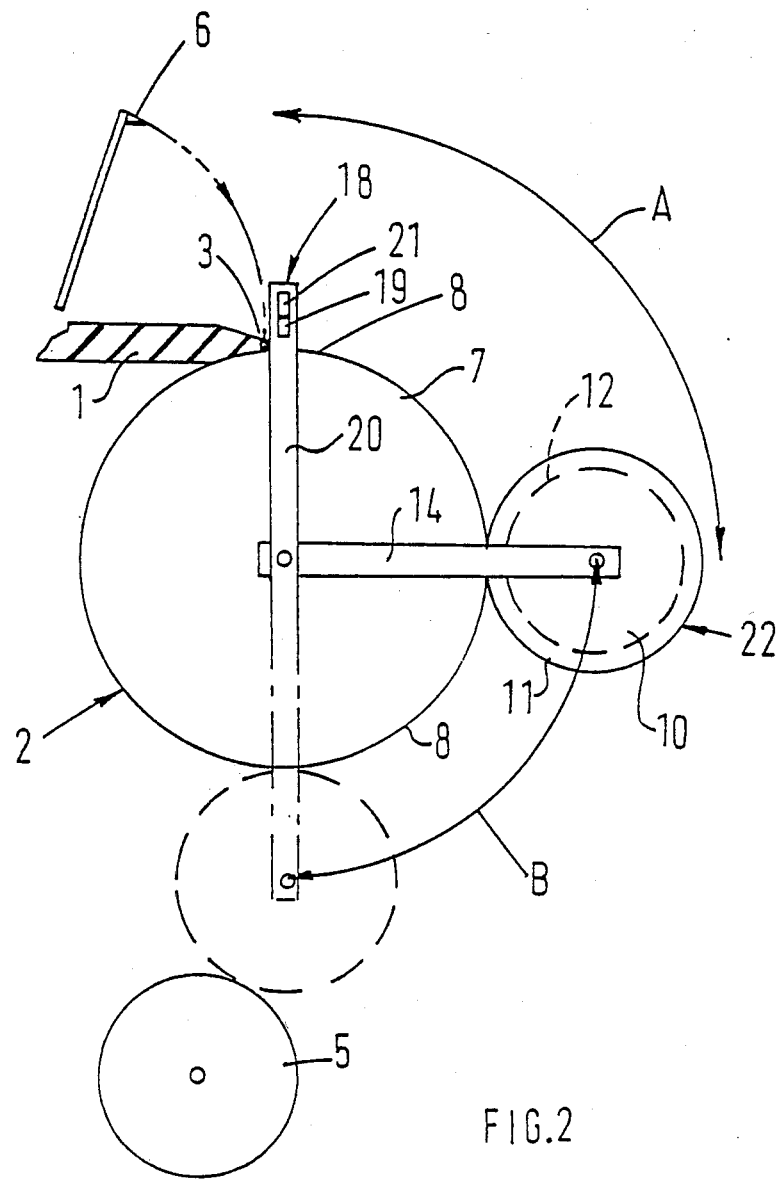
FIG. 2 is a side view of a second embodiment of apparatus according to the present invention for manufacturing two tire sidewalls simultaneously.

The embodiment shown in FIG. 2 is a more complex apparatus intended for making tire sidewalls. Basically the apparatus is the same as the first embodiment and comprises an extruder 1, a component holding member 2 and a pivotally mounted knife blade 6. In this case, however, the leading end of the extrudate 3 is retained on the drum 7 by a first retainer device 18 which comprises a metal strip 19 which extends across the extrudate in the axial direction of the drum 7 and which is mounted between a pair of parallel support arms 20 pivotally mounted at the axis of the drum 7. Mechanical means, not shown, which may be for example air cylinder operated, are provided to move the metal strip 19 in the radial direction in a guide slot 21 in each support arm 20. Drive means are provided to move the support arms 20 around the drum 7 through approximately 90° i.e. the path marked A.

A second retainer mechanism 22 is also provided and this is the same as the single retainer used in the first embodiment comprising a roller 10 having an outer surface 11 in abutment with the drum surface 8 and having formed therein a continuous annular groove 12 of the same cross-section of the extrudate 3. The roller 10 is mounted between a second pair of support arms 14. The assembly of the second retainer mechanism 22, however, is such that it moves only through the 90° of path B.

The carrier 5, onto which the component is transferred for subsequent use, is also more complex than in the first embodiment and comprises a pair of variable diameter drums 23,24 and made up of segments which are linked together and movable as required to give adjustment to their overall diameter. The pair of drums are mounted end-to-end on a common axis and means are provided to allow relative movement of the drums 23,24 in the axial direction to space them apart or position them closely end-to-end as shown in FIGS. 4 and 3 respectively.

The operation of the apparatus to form tire sidewall components uses a die orifice for the extruder having the cross-section of two sidewalls 25,26 joined at a thin central portion 27. (See FIG. 3). This two sidewall extrudate is formed between the die and the holding drum surface 8 and is carried around on the holding drum 7 from the die orifice. The leading end of the extrudate is immediately clamped to the drum surface 8 by the metal strip 19 which is then moved around through path A at the same speed as the holding drum surface 8 and the extrudate. At the end of the path A the metal strip 19 is moved out of engagement with the extrudate, the second retainer mechanism 22 is engaged with the end of the strip and this then retains the leading end in place around the second path B.

Figure 3:
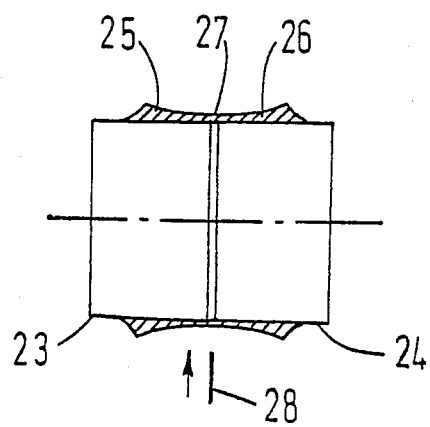
FIGS. 3 and 4 show a component removing assembly for the embodiment of FIG. 2.
Figure 4:
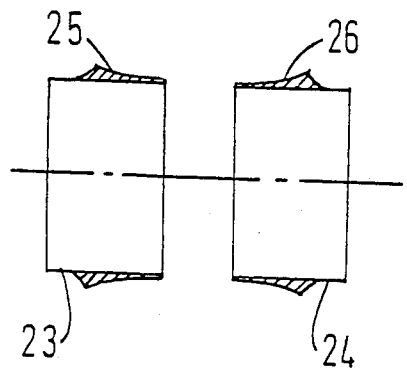

The pair of carrier drums 23 and 24 are moved axially together to the position of FIG. 3 and are then placed at the position of the carrier 5 in FIG. 2.

When the required extrusion length has been extruded onto the drum surface 8 to form the sidewalls 25 and 26 the knife 6 is used to cut off the length. As the extrudate is carried around the drum 7 its length is measured accurately and this is used to adjust the diameters of the pair of drums 23 and 24 so that the length accurately joins end-to-end to form a ring on the drums 23 and 24. The transfer to the drums 23 and 24 is the same as in the first embodiment and a roller is then used to consolidate the join in the extrudate on the drums 23 and 24.

A knife blade 28 is then brought radially inwards to the thin portion 27 of the extruded section which separates the two sidewalls 25 and 26 and the drums 23 and 24 are moved apart. The two sidewalls 25 and 26 resulting may then be transferred to a tire building machine separately or more preferably as an accurately spaced-apart pair of sidewalls.

The invention is not restricted to the abovedescribed embodiments which may be modified in a number of ways. For example a continuous annular component may not be required for all applications and the length of the extrudate may therefore be varied to produce a component of any desired length having free ends. Furthermore it may be preferred to form more than one component on the ring before removing the latter to a subsequent manufacturing stage or sub-stage and this may be achieved by displacing the ring axially prior to commencing the next extrusion. Additional components may be of the same profile or of different profile the latter being effected by changing the die orifice and roller profiles accordingly.

The holding member or drum may be formed with an annular groove corresponding to the profile of the extrudate and the retainer, roller 10 may have a planar surface. An annular groove in the drum may be continuous in the circumferential direction or may be of a length corresponding to the desired length of extrudate. Where the drum surface co-operates with the die outlet to define the orifice the drum may have one or more circumferential abutments which close the outlet to finish an extrudate, a circumferential abutment may project from a planar drum surface or be constituted by the end of a groove formed in the drum surface.

The holding member drum may be replaced by a sector plate having a peripheral surface length corresponding to the required component length.

Means may be provided to raise the temperature of the extrudate while it is held in the extruded profile. Heating of the extrudate may be used to reduce the time taken for the extrudate to reach a stable condition in which the tendency for the extrudate to deform is significantly reduced and/or to enable the degree of adhesion between the extrudate and the surfaces of any of the retainer, holding member and carrier to be varied. The heating means may be incorporated in any of the elements around which the extrudate passes or external heating may be provided. Where the extrudate is heated it is controlled to ensure the increase in temperature does not commence the curing cycle of the elastomeric material.

The component may be extruded using any type of known extruder, for example a fixed die extruder, roller nose die extruder or a ram type extruder.

It will be appreciated the present invention provides a method of and apparatus for producing discrete elastomeric components the dimensions of which are accurately controlled and in which handling of the component during manufacture is avoided. The invention is therefore particularly suited to the manufacture of pneumatic tires in which the various tire components e.g. tread, sidewalls, bead apex strips, packing strips etc. may be formed in individual carrier rings/movable holding members or a single carrier ring/holding member may be used for all suitable components of a tire and transported to an assembly stage where each component may be transferred in sequence to a former on which the tire is built. Such transfer may be carried out without any handling of the components of an operator so that it is possible to build an unvulcanized tire with the individual components automatically positioned in the correct relationship without risk of damage to the components. Alternatively a carrier ring/holding member may be used which itself constitutes the tire former and which is transported between each component manufacturing station in sequence to build the tire.

An unvulcanised tire produced by any of the foregoing methods may be vulcanized while mounted on the former and subsequently stripped, or the unvulcanized tire may be stripped and vulcanized in a conventional manner, the former being radially collapsible to allow the tire to be stripped.

We claim:

1. A method of manufacturing a discrete elastomeric material component comprises extruding elastomeric material through a die orifice onto the surface of a component holding member, and simultaneously effecting relative movement between the die orifice and the surface of the component holding member to apply the extrudate to said surface securing the leading end of the extrudate to the surface of the component holding member by retaining means which moves with the surface of the component holding member and the leading end of the extrudate and finishing the extrudate to produce a discrete component of the required length.

2. A method according to claim 1 wherein the holding member is movable to advance the surface thereof past the die orifice at a rate equal to the rate of extrusion.

3. A method according to claim 1 wherein in addition to the retaining means vacuum is applied to the surface of the holding member to secure the extrudate.

4. A method according to claim 1 wherein the leading end of the extrudate is gripped between confronting surfaces of the holding member and the retaining means.

5. A method according to claim 4 wherein the extrudate is transferred from the holding member to a carrier at a position downstream of the die orifice.

6. A method according to claim 1 wherein the free ends of the component are joined to form an annular component.

7. Apparatus for manufacturing a discrete elastomeric component comprises an extrusion die having a die orifice, a component holding member having a surface positioned to receive an extrudate from the die orifice, means for simultaneously effecting relative movement between the die orifice and the surface of the holding member to apply the extrudate to said surface, retaining means for securing the leading end of the extrudate to the surface of the component holding member, means for moving the retaining means with the surface of the component holding member and the leading end of the extrudate and finishing means to produce a discrete component of the required length.

8. Apparatus according to claim 7 wherein the holding member is movable to advance the surface thereof past the die orifice at a rate equal to the rate of extrusion.

9. Apparatus according to claim 8 wherein the holding member comprises a cylindrical drum rotatable about a central axis to advance the peripheral surface thereof past the die orifice.

10. Apparatus according to claim 7 wherein the retaining means comprises a first retainer means arranged to retain the leading edge of the extrudate for part of the movement and a second retainer means arranged to retain the leading edge of the extrudate for a subsequent part of said movement.

11. Apparatus according to claim 10 wherein the retaining means comprises an annular roller the peripheral surface of which is positioned adjacent to the drum surface in confronting relationship therewith and at least one of the roller peripheral surface and drum surface is profiled to correspond to the cross-section of the extrudate.

12. Apparatus according to claim 11 wherein the roller is rotatable about a first axis of rotation corresponding to the axis of rotation of the drum.

13. Apparatus according to claim 12 including means to lock the roller for rotation with the drum.

14. Apparatus according to claim 12 wherein the roller is rotatable about a second axis of rotation corresponding to the centre of the roller.

15. Apparatus according to claim 8 including a carrier onto which the extrudate is transferred from the holding member via the retaining means.

16. Apparatus according to claim 15 wherein the extrudate is transferred by an alternating system of vacuum and pressure applied to porous surfaces of the holding member, retaining means and carrier.

17. Apparatus according to claim 16 wherein the circumference of the carrier is equal to the length of the extrudate.

18. Apparatus according to claim 10 wherein the retaining means comprises a strip extendable across the extrudate surface.

* * * * *